United States Patent
Ichikawa et al.

(10) Patent No.: US 11,494,470 B2
(45) Date of Patent: Nov. 8, 2022

(54) INFORMATION PROCESSING APPARATUS AND INFORMATION PROCESSING METHOD

(71) Applicant: SONY CORPORATION, Tokyo (JP)

(72) Inventors: Miwa Ichikawa, Tokyo (JP); Yuhei Taki, Kanagawa (JP); Kota Aizawa, Tokyo (JP); Koichi Sakumoto, Tokyo (JP); Naoto Tsuboi, Saitama (JP); Naoya Sazuka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 580 days.

(21) Appl. No.: 16/334,940

(22) PCT Filed: Aug. 2, 2017

(86) PCT No.: PCT/JP2017/028066
§ 371 (c)(1),
(2) Date: Mar. 20, 2019

(87) PCT Pub. No.: WO2018/079001
PCT Pub. Date: May 3, 2018

(65) Prior Publication Data
US 2019/0278896 A1 Sep. 12, 2019

(30) Foreign Application Priority Data
Oct. 24, 2016 (JP) ............... JP2016-207694

(51) Int. Cl.
*G06F 21/00* (2013.01)
*G06F 21/32* (2013.01)
(Continued)

(52) U.S. Cl.
CPC ............... *G06F 21/32* (2013.01); *G06F 3/01* (2013.01); *G06F 3/0354* (2013.01);
(Continued)

(58) Field of Classification Search
None
See application file for complete search history.

(56) References Cited

U.S. PATENT DOCUMENTS

RE42,038 E 1/2011 Abdallah et al.
8,724,861 B1 * 5/2014 Sun ................ G06F 3/042
345/169

(Continued)

FOREIGN PATENT DOCUMENTS

AU 2014334869 B2 3/2016
AU 2016201310 C1 3/2016
(Continued)

OTHER PUBLICATIONS

Bhairannawar, Satish S. et al. An efficient VLSI architecture for fingerprint recognition using O2D-DWT architecture and modified CORDIC-FFT. 2015 IEEE International Conference (SPICES). https://ieeexplore.ieee.org/stamp/stamp.jsp?tp=&arnumber=7091397 (Year: 2015).*

(Continued)

*Primary Examiner* — Jeremiah L Avery
(74) *Attorney, Agent, or Firm* — Chip Law Group

(57) ABSTRACT

An information processing apparatus according to the present disclosure includes a fingerprint information acquisition unit that acquires fingerprint information, a determination unit that determines an action of a finger on the basis of the fingerprint information, and a processing unit that performs specified processing predetermined depending on the action on the basis of the determined action. This configuration makes it possible to perform a desired operation depending on the operation even with a compact apparatus, thereby enhancing user convenience.

14 Claims, 10 Drawing Sheets

(51) Int. Cl.
  *G06F 3/04883* (2022.01)
  *G06F 21/33* (2013.01)
  *G06F 3/0354* (2013.01)
  *G06F 3/0484* (2022.01)
  *G06F 3/01* (2006.01)
  *G06V 40/12* (2022.01)

(52) U.S. Cl.
  CPC ........ *G06F 3/0484* (2013.01); *G06F 3/04883* (2013.01); *G06F 21/33* (2013.01); *G06V 40/1365* (2022.01); *G06F 2203/0338* (2013.01); *G06F 2221/2149* (2013.01)

(56) References Cited

U.S. PATENT DOCUMENTS

| | | | |
|---|---|---|---|
| 2004/0068660 A1 | 4/2004 | Fujita et al. | |
| 2004/0239648 A1 | 12/2004 | Abdallah et al. | |
| 2005/0081040 A1 | 4/2005 | Johnson et al. | |
| 2005/0093834 A1 | 5/2005 | Abdallah et al. | |
| 2005/0160042 A1 | 6/2005 | Russell et al. | |
| 2006/0093192 A1* | 5/2006 | Bechtel | G06V 40/1353 382/126 |
| 2008/0063245 A1* | 3/2008 | Benkley | G06F 3/03547 382/107 |
| 2008/0317302 A1 | 12/2008 | Abdallah et al. | |
| 2009/0201257 A1 | 8/2009 | Saitoh et al. | |
| 2009/0213087 A1 | 8/2009 | Abdallah et al. | |
| 2010/0005314 A1 | 1/2010 | Johnson et al. | |
| 2010/0182125 A1 | 7/2010 | Abdallah et al. | |
| 2010/0318803 A1 | 12/2010 | Russell et al. | |
| 2013/0111575 A1 | 5/2013 | Russell et al. | |
| 2013/0215275 A1* | 8/2013 | Berini | G06F 21/34 348/150 |
| 2013/0305056 A1 | 11/2013 | Johnson et al. | |
| 2014/0298371 A1 | 10/2014 | Russell et al. | |
| 2015/0016695 A1* | 1/2015 | Yoon | G06V 40/1365 382/124 |
| 2015/0074615 A1 | 3/2015 | Han et al. | |
| 2015/0139511 A1* | 5/2015 | Yoon | G06V 40/1306 382/124 |
| 2015/0146945 A1 | 5/2015 | Han et al. | |
| 2015/0178548 A1 | 6/2015 | Abdallah et al. | |
| 2015/0310252 A1* | 10/2015 | Aoki | G06V 40/1365 382/115 |
| 2015/0324570 A1* | 11/2015 | Lee | G06F 21/32 382/124 |
| 2015/0347727 A1 | 12/2015 | Johnson et al. | |
| 2015/0371073 A1* | 12/2015 | Cho | G06F 3/0416 382/124 |
| 2016/0224775 A1 | 8/2016 | Lin | |
| 2016/0260225 A1 | 9/2016 | Thornblom et al. | |
| 2016/0308854 A1 | 10/2016 | Russell et al. | |
| 2017/0032166 A1* | 2/2017 | Raguin | G06V 40/13 |
| 2017/0357320 A1* | 12/2017 | Chaudhri | G06F 3/04817 |
| 2017/0359335 A1 | 12/2017 | Johnson et al. | |
| 2018/0144178 A1 | 5/2018 | Han et al. | |
| 2018/0173928 A1 | 6/2018 | Han et al. | |
| 2018/0173929 A1 | 6/2018 | Han et al. | |
| 2018/0173930 A1 | 6/2018 | Han et al. | |
| 2018/0309750 A1 | 10/2018 | Johnson et al. | |
| 2019/0220647 A1 | 7/2019 | Han et al. | |

FOREIGN PATENT DOCUMENTS

| | | |
|---|---|---|
| AU | 2018202712 A1 | 5/2018 |
| CA | 2527829 A1 | 12/2004 |
| CA | 2527836 A1 | 12/2004 |
| CA | 2724292 A1 | 12/2004 |
| CA | 2857208 A1 | 12/2004 |
| CA | 2527826 A1 | 1/2005 |
| CA | 2737868 A1 | 1/2005 |
| CN | 1502074 A | 6/2004 |
| CN | 101506760 A | 8/2009 |
| CN | 103315744 A | 9/2013 |
| CN | 105659522 A | 6/2016 |
| CN | 105843500 A | 8/2016 |
| CN | 106095247 A | 11/2016 |
| CN | 109101155 A | 12/2018 |
| CN | 109117044 A | 1/2019 |
| DE | 112014004134 T5 | 7/2016 |
| DK | 1629624 T3 | 6/2013 |
| EP | 1359496 A1 | 11/2003 |
| EP | 1629408 A2 | 3/2006 |
| EP | 1629460 A2 | 3/2006 |
| EP | 1629624 A2 | 3/2006 |
| EP | 1892611 A1 | 2/2008 |
| EP | 3044903 A1 | 7/2016 |
| EP | 3101868 A1 | 12/2016 |
| EP | 3422231 A1 | 1/2019 |
| ES | 2705581 T3 | 3/2019 |
| JP | 11-019069 A | 1/1999 |
| JP | 11-212689 A | 8/1999 |
| JP | 2001-242952 A | 9/2001 |
| JP | 2004-259173 A | 9/2004 |
| JP | 2005-235157 A | 9/2005 |
| JP | 2006-099230 A | 4/2006 |
| JP | 3951920 B2 | 8/2007 |
| JP | 4680918 B2 | 5/2011 |
| JP | 2011-172159 A | 9/2011 |
| JP | 5227381 B2 | 7/2013 |
| JP | 5248548 B2 | 7/2013 |
| JP | 2015-520456 A | 7/2015 |
| JP | 5763872 B2 | 8/2015 |
| JP | 2016-066248 A | 4/2016 |
| JP | 6306493 B2 | 4/2018 |
| JP | 6356249 B2 | 7/2018 |
| JP | 6457978 B2 | 1/2019 |
| KR | 10-2007-0110130 A | 11/2007 |
| KR | 10-2016-0048215 A | 5/2016 |
| KR | 10-2016-0054573 A | 5/2016 |
| KR | 10-2018-0091970 A | 8/2018 |
| KR | 10-2018-0123596 A | 11/2018 |
| KR | 10-2019-0060883 A | 6/2019 |
| TW | 201528120 A | 7/2015 |
| TW | 201610826 A | 3/2016 |
| TW | 201627914 A | 8/2016 |
| TW | 201810011 A | 3/2018 |
| TW | 201833753 A | 9/2018 |
| TW | 201909029 A | 3/2019 |
| WO | 2002/065268 A1 | 8/2002 |
| WO | 2004/109454 A2 | 12/2004 |
| WO | 2004/109455 A2 | 12/2004 |
| WO | 2005/001611 A2 | 1/2005 |
| WO | 2006/126310 A1 | 11/2006 |
| WO | 2015/020465 A1 | 2/2015 |
| WO | 2015/057320 A1 | 4/2015 |

OTHER PUBLICATIONS

Cappelli, Raffaele et al. Minutia Cylinder-Code: A New Representation and Matching Technique for Fingerprint Recognition. IEEE Transactions on Pattern Analysis and Machine Intelligence, vol. 32, Issue: 12. https://ieeexplore.ieee.org/stamp/stamp.jsp?tp=&arnumber=5432197 (Year: 2010).*

Extended European Search Report of EP Application No. 17864305.2, dated Oct. 22, 2019, 10 pages.

Office Action for JP Patent Application No. 2018-547139, dated Apr. 6, 2021, 05 pages of English Translation and 05 pages of Office Action.

International Search Report and Written Opinion of PCT Application No. PCT/JP2017/028066, dated Sep. 19, 2017, 12 pages of ISRWO.

Office Action for JP Patent Application No. 2018-547139, dated Aug. 31, 2021, 04 pages of English Translation and 04 pages of Office Action.

(56) References Cited

OTHER PUBLICATIONS

Office Action for CN Patent Application No. 201780064016.0, dated Sep. 9, 2021, 08 pages of English Translation and 05 pages of Office Action.

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/028066 filed on Aug. 2, 2017, which claims priority benefit of Japanese Patent Application No. JP 2016-207694 filed in the Japan Patent Office on Oct. 24, 2016. Each of the above-referenced applications is hereby incorporated herein by reference in its entirety.

TECHNICAL FIELD

The present disclosure relates to an information processing apparatus, an information processing method, and a program.

BACKGROUND ART

In related art, in one example, Patent Literature 1 below discloses an input device having the ability to add easily a fingerprint detection and collation function to an information processing apparatus having a limited number of connection portions of peripheral equipment by allowing an IC card having the fingerprint detection and collation function to be loaded in the device body.

CITATION LIST

Patent Literature

Patent Literature 1: JP 3951920B

DISCLOSURE OF INVENTION

Technical Problem

Wearable devices such as smartwatches attached to the user's body are spreading nowadays. Given that pursuit of simplicity, portability, miniaturization, or the like of the wearable device is considered, operation portions such as buttons are assumed to become smaller and smaller, and so there is a concern that the usability is lowered as the operation portion becomes smaller.

Thus, a desired operation is necessary to be performed in response to the operation even with a compact apparatus.

Solution to Problem

According to the present disclosure, there is provided an information processing apparatus including: a fingerprint information acquisition unit configured to acquire fingerprint information; a determination unit configured to determine an action of a finger on the basis of the fingerprint information; and a processing unit configured to perform specified processing predetermined depending on the action on the basis of the determined action.

Moreover, according to the present disclosure, there is provided an information processing method including: acquiring fingerprint information; determining an action of a finger on the basis of the fingerprint information; and performing specified processing predetermined depending on the action on the basis of the determined action.

Moreover, according to the present disclosure, there is provided a program causing a computer to function as: a means configured to acquire fingerprint information; a means configured to determine an action of a finger on the basis of the fingerprint information; and a means configured to perform specified processing predetermined depending on the action on the basis of the determined action.

Advantageous Effects of Invention

According to the present disclosure as described above, it is possible to perform a desired operation in response to the operation even with a compact apparatus.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
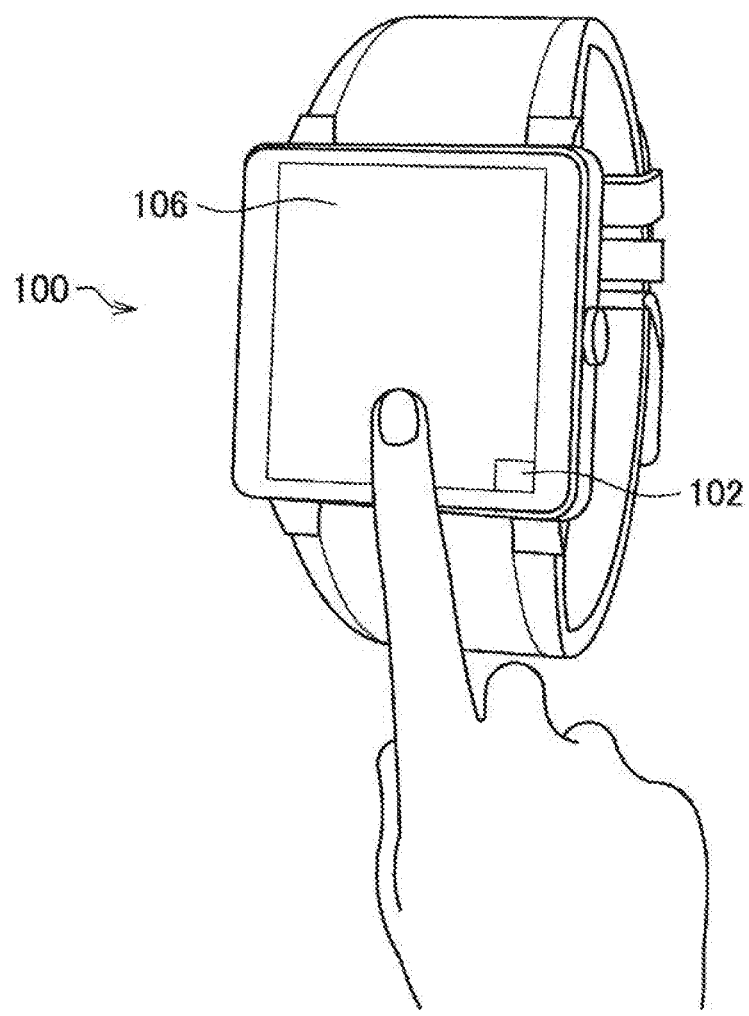
FIG. 1 is a schematic diagram illustrating how to operate a smartwatch as an example of a wearable device.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, the description will be given in the following order.
1. Background
2. Configuration example of smartwatch
3. Example of processing performed in smartwatch
4. Arrangement of fingerprint sensor and operation discrimination method
5. Example of bracelet device
6. Method of operating UI and registration of fingerprint information
7. Various processing based on fingerprint determination 1. Background Wearable devices such as, for example, smartwatches have been used in recent years. FIG. 1 is a schematic diagram illustrating how to operate a smartwatch 100 according to the present embodiment as an example of wearable devices. The smartwatch 100 has a touch panel 106 and a fingerprint sensor 102. The smartwatch 100 performs a desired operation or processing requested by the user by allowing the user to operate the touch panel 106 or a button (not shown). In addition, the user touches the fingerprint on the fingerprint sensor 102, so the smartwatch 100 performs authentication and performs a desired operation or processing requested by the user.

Given that pursuit of simplicity, portability, miniaturization, or the like of the wearable device is considered, its operating portion is assumed to become smaller and smaller. In addition, given that important information such as biological information is accumulated in the wearable device is considered, higher security is necessary for the wearable device. Furthermore, there is also a desire for the wearable device to implement complicated entry operations, such as entry of text, or more complicated various functions.

Fingerprint authentication is widely used for security purposes. However, the personal authentication using a fingerprint of one finger has a security problem, for example, other person may cause an owner's finger to touch the device to succeed in authentication while the owner of a device is sleeping. In addition, from the viewpoint of operability, it is difficult to enter text or implement various functions on a small screen like a wearable device at present.

The present embodiment allows entry of text or implementation of various functions on a small screen like a wearable device to be achieved and respective functions or applications to be switched depending on the type of an operating finger, the direction of motion of the finger, how to move the finger (short press or long press, or light touch or force touch), or the like. In addition, from the viewpoint of authentication, high security can be achieved by combining fingerprint authentication and password entry by numerals or characters. This is described in detail below.

2. Configuration Example of Smartwatch

Figure 2:
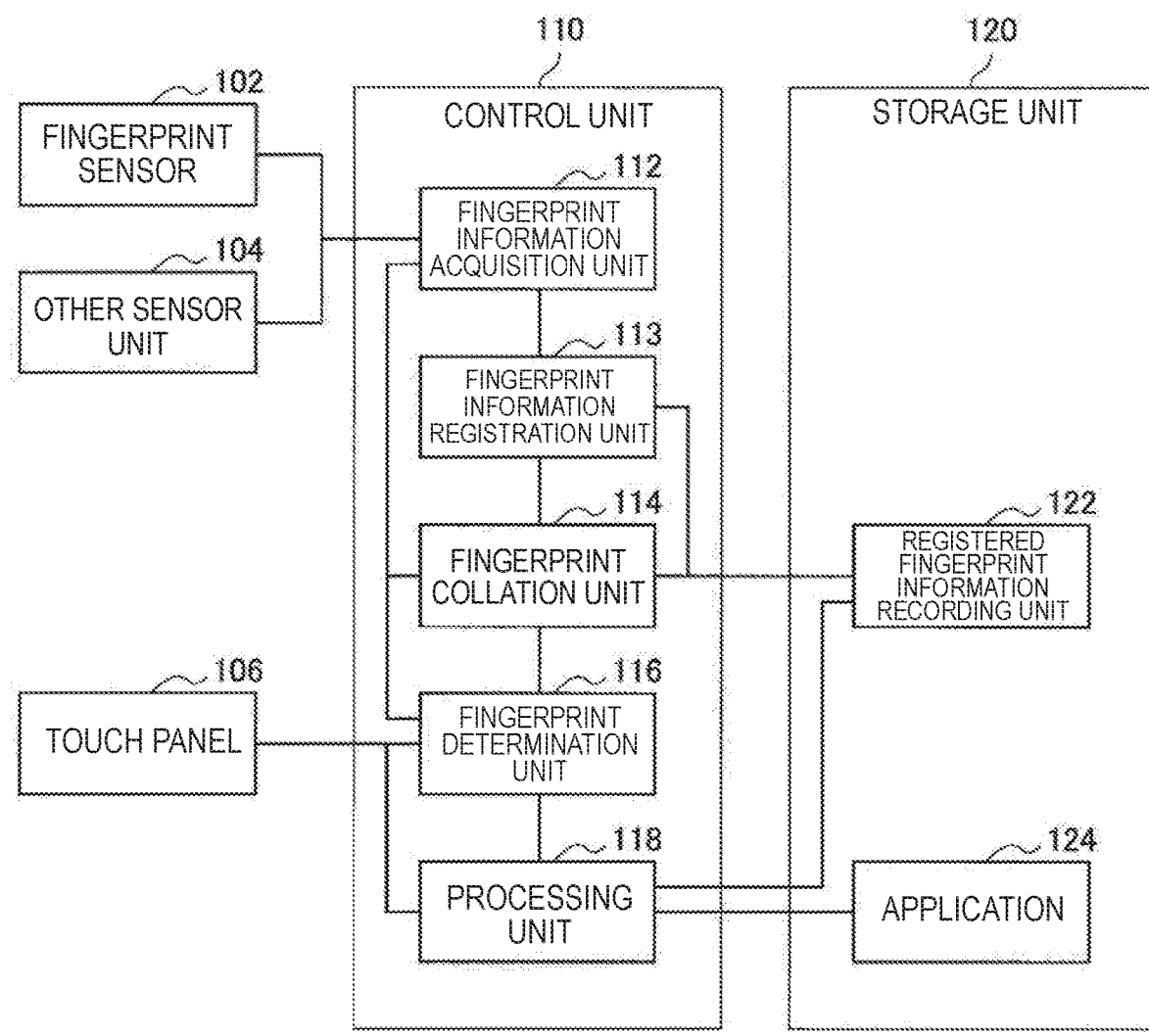
FIG. 2 is a block diagram illustrating a configuration of a smartwatch according to the present embodiment.

FIG. 2 is a block diagram illustrating the configuration of the smartwatch 100 according to the present embodiment. The smartwatch 100 includes a fingerprint sensor 102, an other sensor unit 104, a touch panel 106, a control unit 110, and a storage unit 120. The fingerprint sensor 102 detects fingerprint information related to a fingerprint from an image obtained by image capture. The fingerprint sensor 102 may detect the fingerprint information from electrostatic capacitance. In a case of optical detection of fingerprint information from an image, the fingerprint information is image information representing the shape of the fingerprint. In addition, in a case of electrostatic detection in which the fingerprint information is detected from electrostatic capacitance, the fingerprint information is electrostatic capacitance corresponding to convex and concave parts of a fingerprint.

In addition, the fingerprint sensor 102 may detect a fingerprint using other techniques including thermal, electric field, piezoelectric, or the like. More specifically, in the optical detection, the fingerprint information is detected by placing a finger on a prism or glass surface and by capturing an image of the finger with a CCD camera or the like from the opposite side of the surface on which the finger is placed. The electrostatic detection is a way of obtaining fingerprint information based on a difference in charge amounts between mountains (parts where the skin forming a fingerprint pattern is raised) and valleys of a fingerprint when a finger is pressed against the fingerprint sensor 102. The thermal detection is a way of obtaining fingerprint information from detection of a temperature difference between a temperature (body temperature) of a mountain portion and a temperature of a valley (air temperature) of a fingerprint coming into contact with the surface of the fingerprint sensor 106. The electric field detection is a way of using, as fingerprint information, a distribution pattern produced from a difference in intensity of electric field between a peak portion and a valley portion of a fingerprint, which is generated by a weak current flowing on the surface of a finger. The touch panel 106 includes a display unit such as a liquid crystal display (LCD) and a touch sensor. The smartwatch 100 may include a component such as a loudspeaker for outputting information by speech. The other sensor unit 104 is a sensor other than the fingerprint sensor 102, and includes, in one example, a position sensor (GPS) for detecting position information of the smartwatch 100, a temperature sensor for detecting the temperature of the finger, a pressure sensor for detecting the pressing force of the finger, or the like.

The control unit 110 is a component that performs various processing of the smartwatch 100, and includes a fingerprint information acquisition unit 112, a fingerprint information registration unit 113, a fingerprint collation unit 114, a fingerprint determination unit 116, and a processing unit 118. The storage unit 120 has a registered fingerprint information recording unit 122 for recording the registered fingerprint information. In addition, the storage unit 120 has programs and data of various applications 124 corresponding to the smartwatch 100 stored therein. Moreover, the components of the control device 110 illustrated in FIG. 2 can include circuits (hardware), or include a central processing unit such as CPU and a program (software) for making it function.

The fingerprint information acquisition unit 112 acquires fingerprint information detected by the fingerprint sensor 102. The fingerprint information registration unit 113 registers the fingerprint information acquired by the fingerprint information acquisition unit 112 in the registered fingerprint information recording unit 122. The fingerprint information acquisition unit 112 acquires fingerprint information for each user. The fingerprint information for each user includes fingerprint information indicating the shape of a fingerprint of each finger of the right hand and the left hand, fingerprint information when each finger is tilted, or the like. The fingerprint information for each user is registered in the registered fingerprint information recording unit 122. The fingerprint collation unit 114 collates the fingerprint information acquired by the fingerprint sensor 102 with the fingerprint information registered in the registered fingerprint information recording unit 122, and performs authentication. The fingerprint collation unit 114 is also capable of performing authentication by comparing a password entered from the touch panel 106 with a password registered previously in the storage unit 120 in addition to the fingerprint information. In this case, it is possible to enhance the security by using both the fingerprint information and password authentication.

The fingerprint determination unit 116 determines, in a case where the authentication by the collation unit 114 is successful, the type of a finger or action of the finger (operation by finger) on the basis of the fingerprint information acquired by the fingerprint information acquisition unit 112 and the information registered in the registered fingerprint information recording unit 122. The registered fingerprint information recording unit 122 records information corresponding to the type or action of the finger corresponding to the registered fingerprint information in association with the specified processing to be performed by the smartwatch 100. The processing unit 118 refers to the processing associated with the registered fingerprint information recording unit 122 and performs the specified processing that is capable of being executed by the smartwatch 100, such as activation of the application 124 and movement of focus, on the basis of a result obtained by determination of the fingerprint determination unit 116. The touch panel 106 displays the process or result of the processing.

3. Example of Processing Performed in Smartwatch

Figure 3:
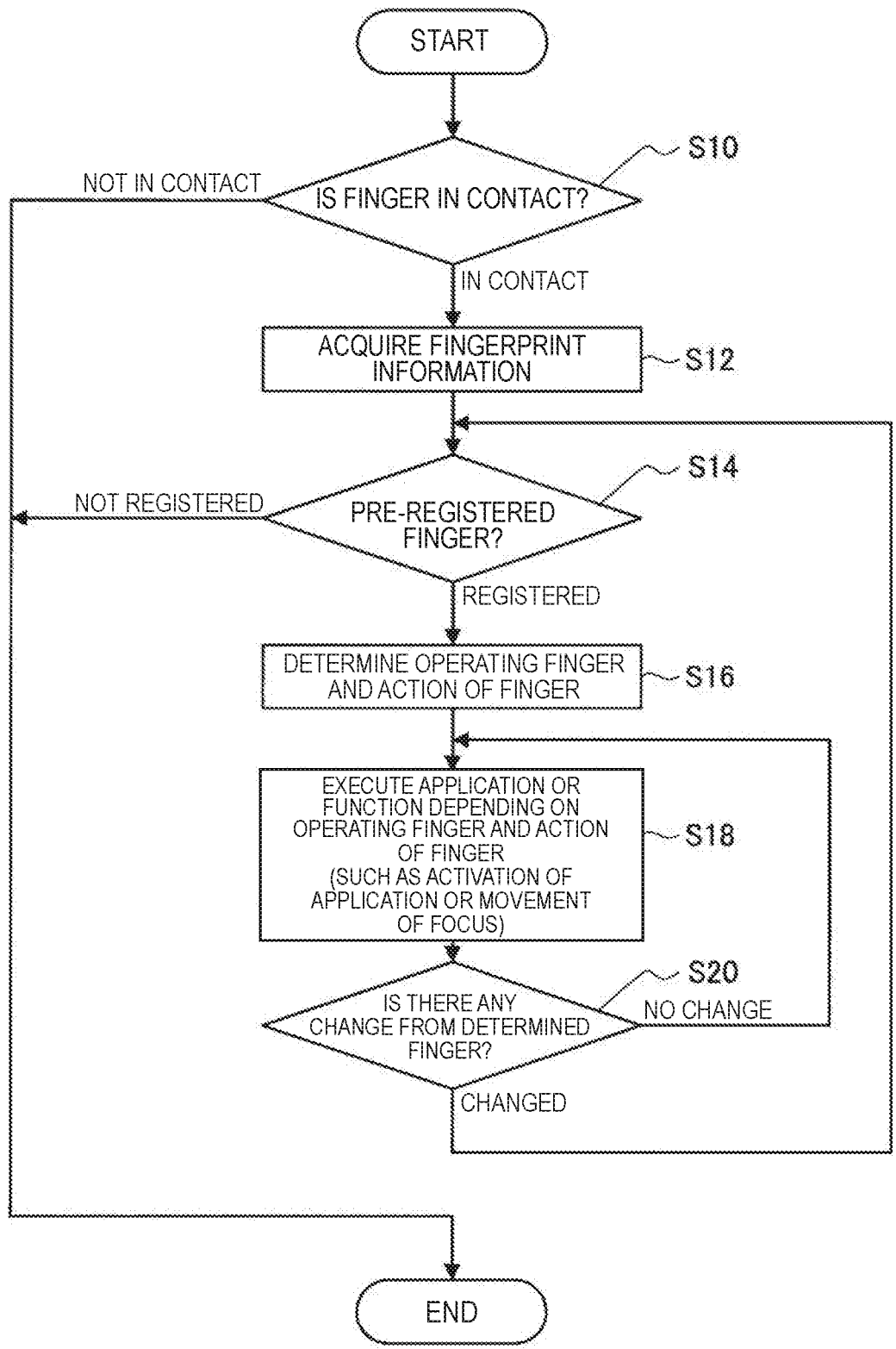
FIG. 3 is a flowchart illustrating processing performed in a smartwatch.

FIG. 3 is a flowchart illustrating processing performed by the smartwatch 100. In step S10, the fingerprint information acquisition unit 112 first determines whether or not a finger is in contact with the fingerprint sensor 102 on the basis of the fingerprint information obtained from the fingerprint sensor 102, and in a case where the finger is in contact with the fingerprint sensor 102, acquires the fingerprint information in the next step S12. In the next step S14, the fingerprint collation unit 114 determines whether or not the finger is the fingerprint information registered previously in the registered fingerprint information recording unit 122 on the basis of the acquired fingerprint information, and in a case where the fingerprint information is registered, the processing proceeds to step S16. In step S16, the fingerprint determination unit 116 performs determination of an operating finger (determination as to whether it is an index finger or a middle finger) or determination of action of a finger (determination of position, motion direction, inclination, etc.).

In the next step S18, the processing unit 118 activates the application 124 or executes the function depending on the type of the operating finger or the action of the finger, which is determined in step S16. More specifically, the processing of activation of the application 124, movement of focus, or the like is performed depending on the type and action of the operating finger.

In the next step S20, the fingerprint information acquisition unit 112 determines whether or not there is a change from the finger determined in step S16, and in a case where there is a change, the processing proceeds to step S14 and the subsequent processing is performed again. On the other hand, in a case where there is no change, the processing of step S18 is continued.

Further, in a case where it is determined in step S10 that the finger is not in contact with the fingerprint sensor 102 or it is determined that the finger is not a pre-registered finger in step S14, the processing is terminated.

4. Arrangement of Fingerprint Sensor and Operation Discrimination Method

Figure 4:
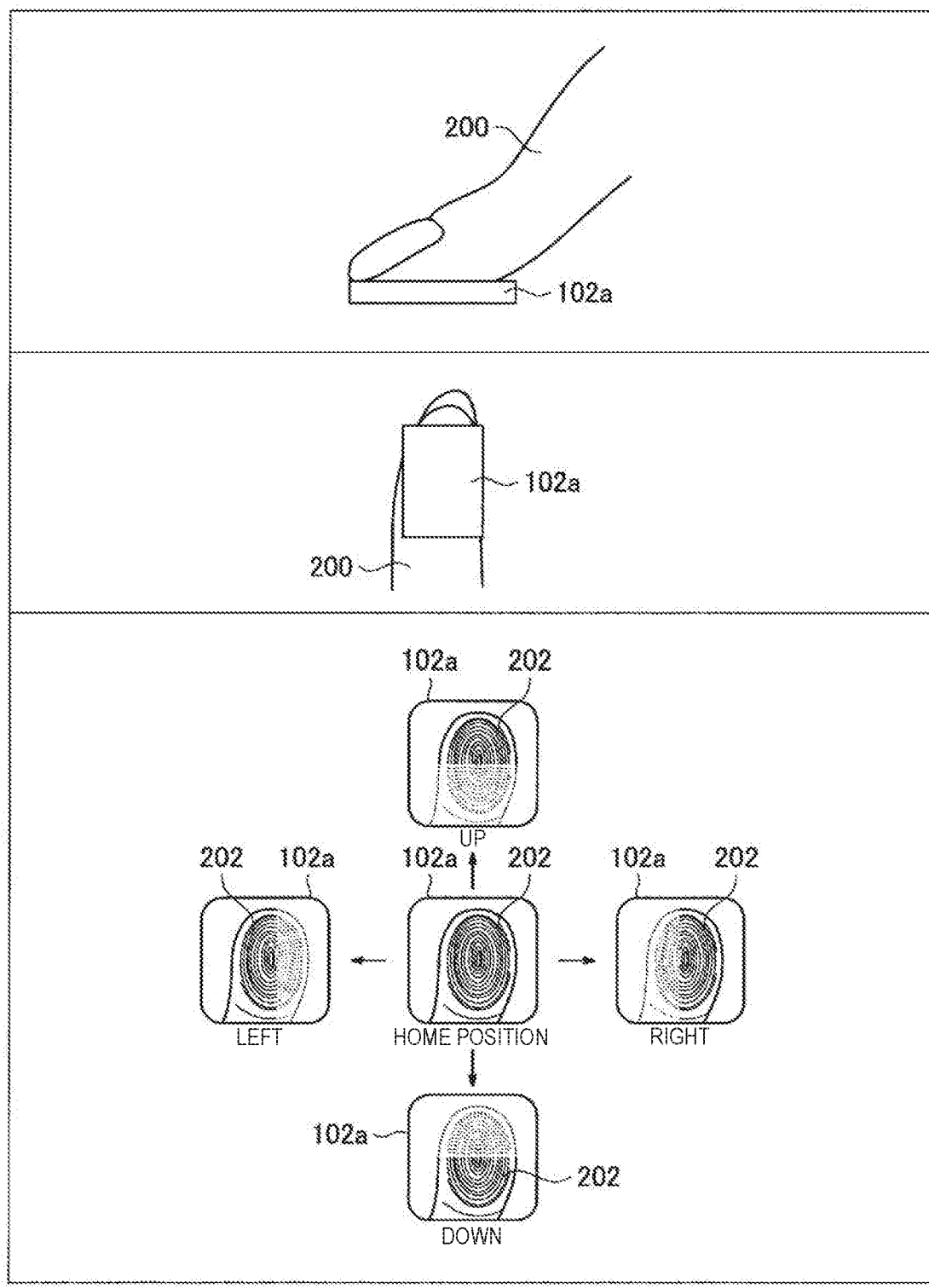
FIG. 4 is a schematic diagram illustrated to describe arrangement of a fingerprint information acquisition unit (fingerprint sensor) and an operation discrimination method.
Figure 5:
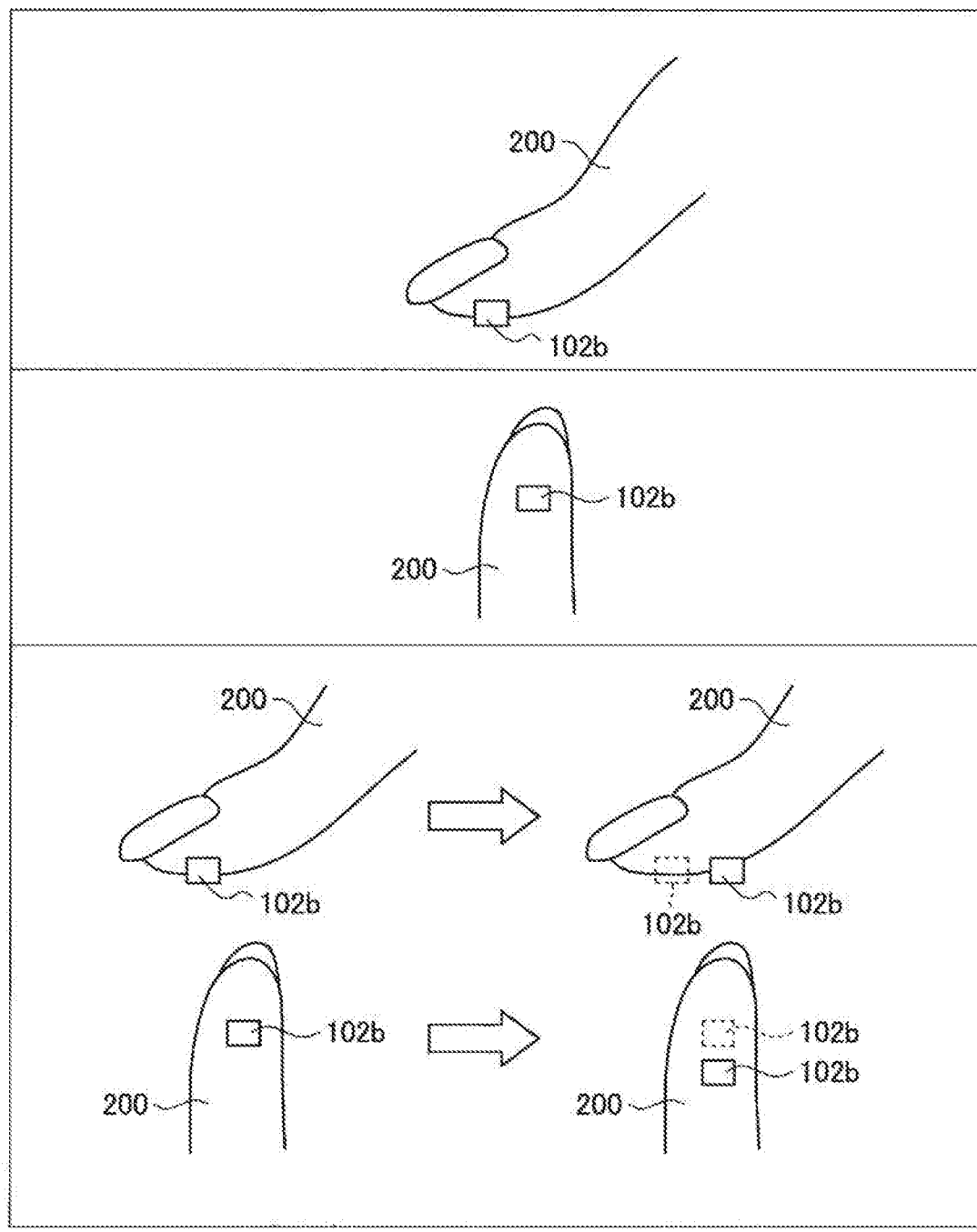
FIG. 5 is a schematic diagram illustrated to describe arrangement of a fingerprint information acquisition unit (fingerprint sensor) and an operation discrimination method.
Figure 6:
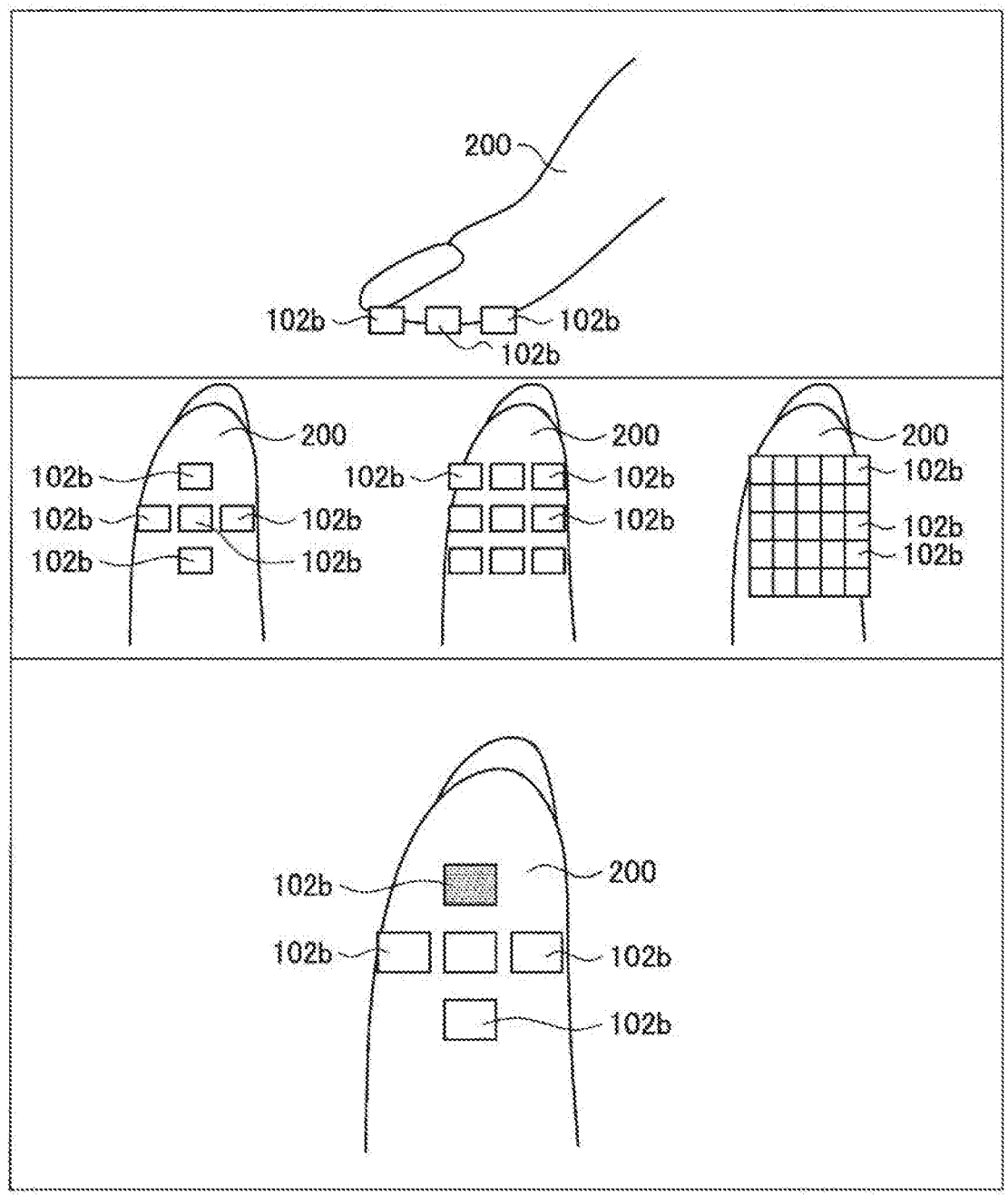
FIG. 6 is a schematic diagram illustrated to describe arrangement of a fingerprint information acquisition unit (fingerprint sensor) and an operation discrimination method.

FIGS. 4 to 6 are schematic diagrams illustrated to describe the arrangement of the fingerprint sensor 102 and the operation discrimination method. In each of FIGS. 4 to 6, "a side view of a state in which the finger is in contact with the fingerprint sensor", "a bottom view of a state where the finger is in contact with the fingerprint sensor", and "a view showing an operation discrimination method" are illustrated in order from the top.

FIG. 4 illustrates a case where a fingerprint sensor 102a having a size equivalent to a fingerprint 202 of a finger 200 is used as the fingerprint sensor and the operation discrimination is performed depending on the type or action of the finger 200 that is in contact with the fingerprint sensor 102a. In the example illustrated in FIG. 4, the operation discrimination is performed by tilting the finger 200. In this case, in tilting the finger 200, a part of the fingerprint 202 rises, and so only a part of the fingerprint 202 of the finger 200 is detected as shown in "the view showing an operation discrimination method". Then, the detection of only a part of the fingerprint 202 of the finger 200 allows the direction in which the finger 200 is tilted to be recognized. This makes it possible to perform specified processing such as activation of the application 124 or movement of focus depending on the direction in which the finger 200 is tilted. According to the example illustrated in FIG. 4, the specified processing can be performed only by tilting the finger 200 with no motion of the finger 200. In addition, it is also possible to use the fingerprint sensor 102a in combination with an existing sensor such as a pressure sensor by using the detection by the fingerprint sensor 102a as a trigger. There are advantages of this approach such as, in a case of using a fingerprint sensor of a type like an optical fingerprint sensor that can read a fingerprint pattern even when it is wet with water. In one example, even when it is operated in a state where the device is wet with water or when it is operated in underwater environments, it is possible to prevent a situation where a finger and water are not distinguished like in a typical touch panel and to prevent the occurrence of malfunction.

FIG. 5 illustrates a case where one fingerprint sensor 102b smaller than the fingerprint of the finger is used and the operation discrimination is performed depending on the finger that is grounded in the fingerprint sensor 102b or motion of the finger. In this case, when the finger 200 is moved, it is possible to discriminate in which direction the finger 200 is moved on the basis of the motion of the shape of the fingerprint 202 as shown in the "view showing the operation discrimination method". More specifically, it is determined in which direction the finger is moved by comparing the fingerprint information acquired at the current time with the fingerprint information acquired one cycle before on the basis of the fingerprint information acquired every control cycle. This moving direction may be determined by tracking the same feature point and calculating its moving direction, or by calculating the moving direction in which the correlation as the whole image becomes the maximum. In addition, minutiae points of fingerprints or sweat gland information may be used as the feature point. This makes it possible to perform the specified processing such as activation of the application 124 or movement of the focus depending on the direction in which the finger 200 is moved. According to the example illustrated in FIG. 5, it is possible to make the fingerprint sensor 102b as small as possible and to get to know the motion of the finger even when the fingerprint sensor 102b is small.

FIG. 6 illustrates a case where a plurality of fingerprint sensors 102b smaller than the fingerprint 202 of the finger 200 is used, a plurality of fingerprint sensors 102b is arranged at their respective necessary positions, and the operation discrimination is performed depending on the type and motion of the finger 200 that is in contact with the fingerprint sensor 102b. In the example illustrated in FIG. 6, the operation discrimination is performed depending on the positions or ratios in contact with the fingerprint sensors 102*b*. In this case, when the finger 200 is tilted, a part of the fingerprint 202 rises as shown in the "view showing the operation discrimination method", so only a part of the plurality of fingerprint sensors 102*b* detects the fingerprint 202. The "view showing operation discrimination method" shows how fingerprint information is detected only by the fingerprint sensor 102*b* at the tip among the four fingerprint sensors 102*b* in a case where the finger 200 is tilted forward. In this way, the detection of the fingerprint by only a part of the plurality of fingerprint sensors 102*b* allows the direction in which the finger 200 is tilted to be recognized. This makes it possible to perform the specified processing such as activation of the application 124 or movement of the focus depending on the direction in which the finger 200 is tilted. In addition, according to the example illustrated in FIG. 6, it is possible to use the fingerprint sensors 102*b* by combining the plurality of fingerprint sensors 102*b* having different positions in accordance with the operation method.

Moreover, in the examples illustrated in FIGS. 4 and 6, it is possible to determine in which direction the finger is moved by the motion of the fingerprint 202, which similar to the example of FIG. 5.

As described above, according to the examples illustrated in FIGS. 4 to 6, it is possible to detect the action (motion direction or inclination) of the finger 200 by detecting the fingerprint 202. Accordingly, the smartwatch 100 is capable of performing the specified processing depending on the action of the finger 200.

5. Example of Bracelet Device

Figure 7:
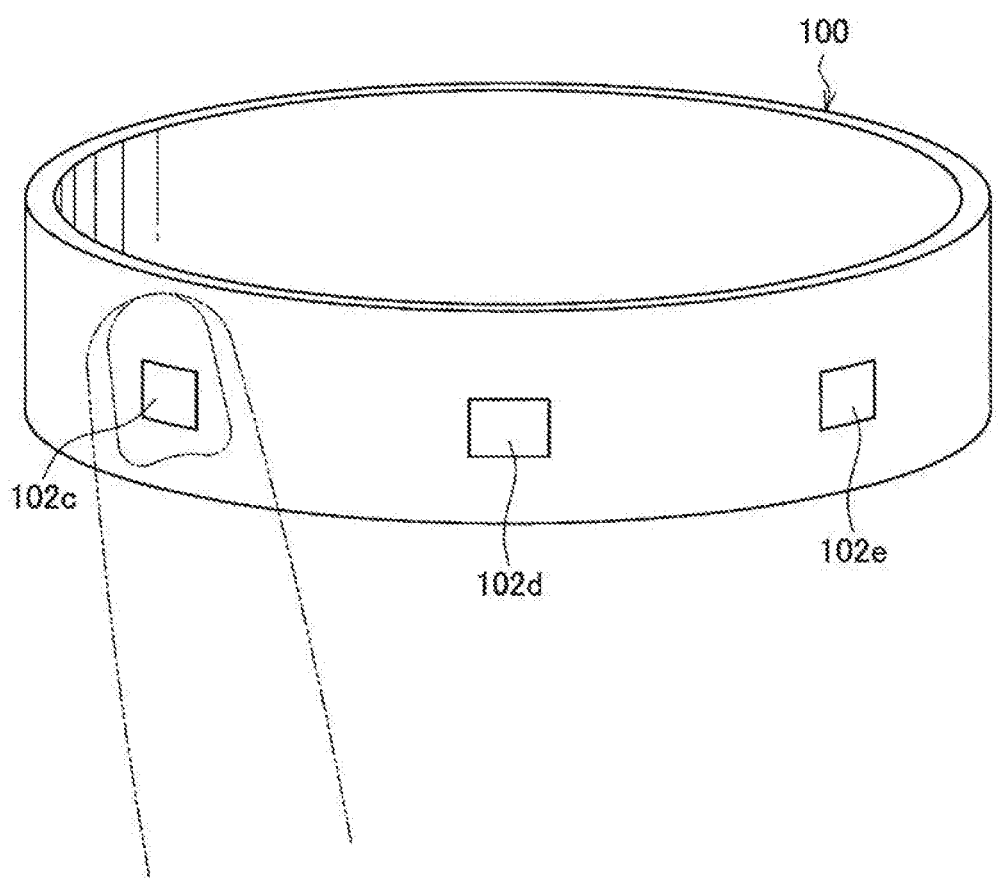
FIG. 7 is a schematic diagram illustrating an example of a bracelet device as a wearable device.

FIG. 7 is a schematic diagram illustrating an example of a bracelet device 100 as a wearable device. In the example illustrated in FIG. 7, a plurality of fingerprint sensors 102*c*, 102*d*, and 102*e* functioning as the fingerprint sensor 102 is provided on the outer peripheral surface of the bracelet device 100. The fingerprint sensors 102*c*, 102*d*, and 102*e* are arranged at different positions, and the operation discrimination is performed on the basis of the type and action of fingers that are in contact with the fingerprint sensors 102*c*, 102*d*, and 102*e*, and combination thereof. In this example, the operation discrimination is performed depending on which finger is in contact with the fingerprint sensors 102*c*, 102*d*, and 102*e* located at different positions and its position. In one example, if the fingerprint sensor 102*c* at the left end is in contact twice with the index finger and the fingerprint sensor 102*d* in the middle is in contact once with the middle finger, the bracelet device performs the specified processing. According to the example illustrated in FIG. 7, it is possible to arrange the fingerprint sensors depending on the shape of the device. In the case of a device attached to an arm as illustrated in FIG. 7, fingerprint sensors are provided at different positions of the bracelet, thereby implementing the desired processing by touching different positions of the bracelet.

Figure 8:
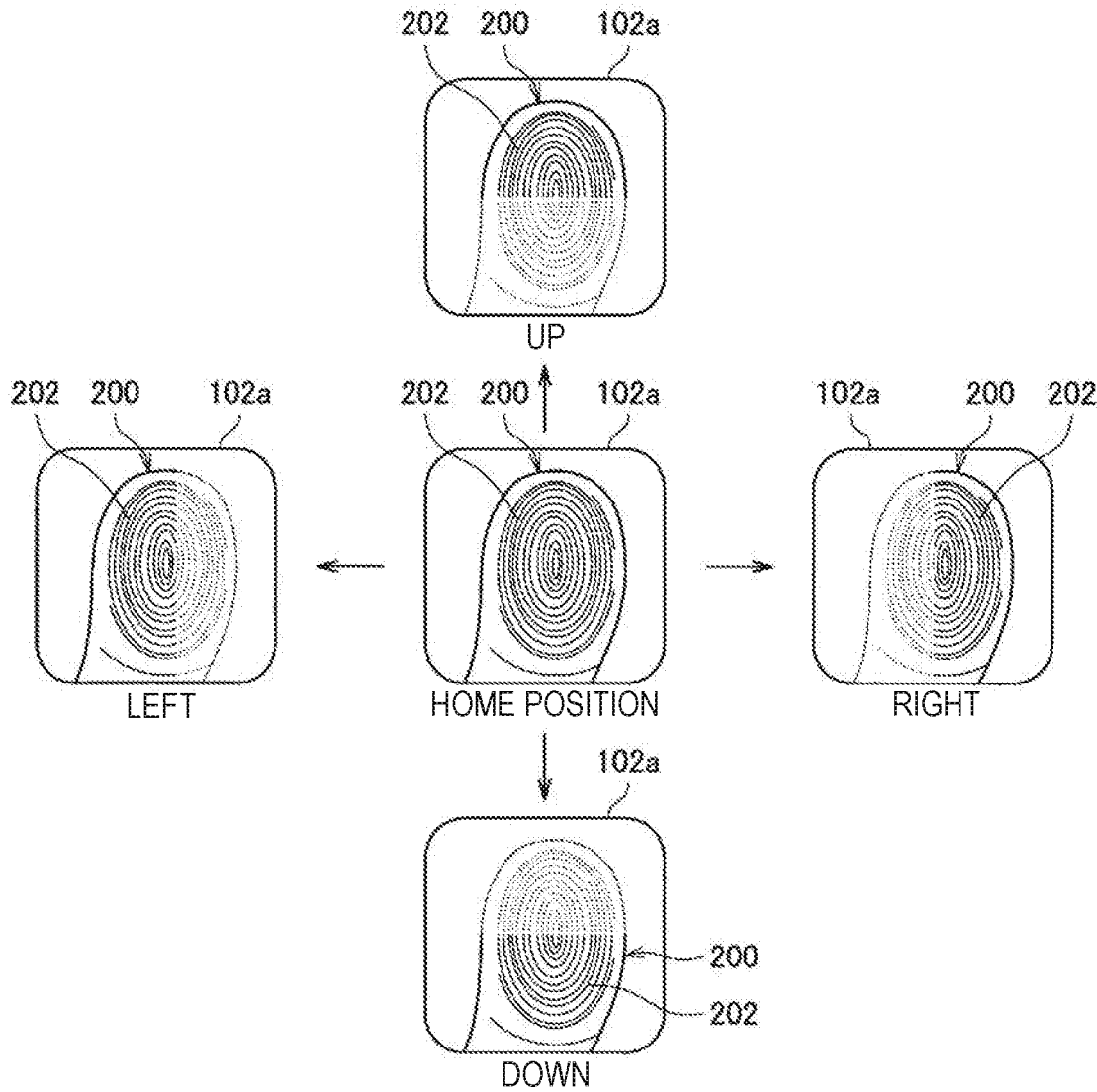
FIG. 8 is a schematic diagram illustrating how to pre-register each position of fingers in the example of FIG. 4.

FIG. 8 is a schematic diagram illustrating how the fingerprint information registration unit 113 pre-registers each position of the finger 200 in the example of FIG. 4. As illustrated in FIG. 8, the fingerprint information is registered at the home position where the entire surface of the fingerprint 202 is in close contact with the sensor surface of the fingerprint sensor 102*a*. In addition, a part of the fingerprint 202 is registered for each of the case of tilting the finger 200 up, the case of tilting it to the right, the case of tilting it to the left, and the case of tilting it down. The registered fingerprint information is recorded in the registered fingerprint information recording unit 122. In a case where the fingerprint sensor 102*a* detects fingerprint information using an image, the images as illustrated in FIG. 8 are registered as the fingerprint information. In addition, in a case where the fingerprint sensor 102*a* detects fingerprint information using electrostatic capacitance, the value of the electrostatic capacitance corresponding to the shape of the fingerprint illustrated in FIG. 8 is registered as the fingerprint information.

6. Method of Operating UI and Registration of Fingerprint Information

Figure 9:
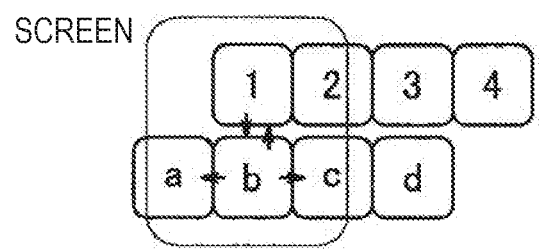
FIG. 9 is a schematic diagram illustrating a method at the time of operating a UI.

FIG. 9 is a schematic diagram illustrating a method at the time of operating the UI. When the user first touches the home position of the touch panel 106, the focus falls on the first character (e.g., "1") or the preceding focused character. In this state, the focused character is displayed at the center of the touch panel 106. In this state, as illustrated in FIG. 4, when the finger 200 is tilted up, down, left, and right with the finger 200 placed on the fingerprint sensor 102*a*, the focus is moved and the character in the tilted direction is displayed at the center of the touch panel 106. Then, when the finger 200 is released from the state of the home position, the character is determined. As described above, according to the present embodiment, it is possible to perform the entry of text only by tilting the finger 200.

Figure 10:
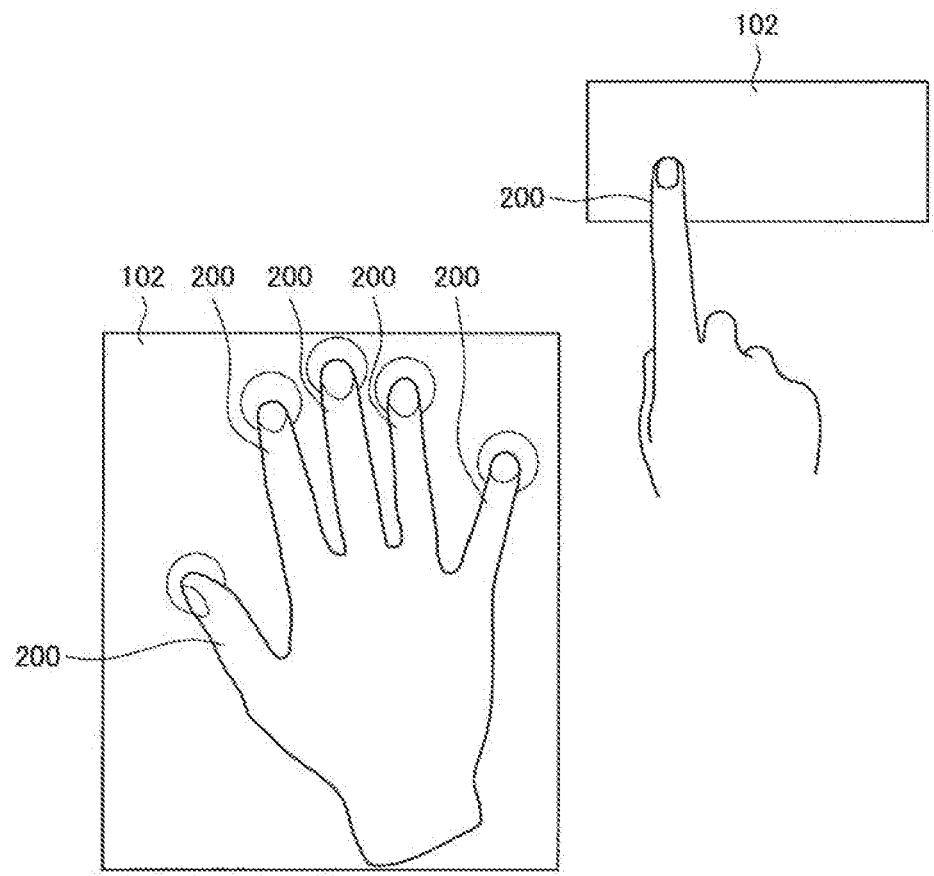
FIG. 10 is a schematic diagram illustrating how to register a fingerprint of each finger.

FIG. 10 is a schematic diagram illustrating how to register a fingerprint of each finger. As illustrated in FIG. 10, fingerprints 202 of thumb, index finger, middle finger, ring finger, and little finger are respectively registered. FIG. 10 illustrates an example in which fingerprint information pieces of a plurality of fingers 200 are registered at once using the fingerprint sensor 102 with relatively large size. In the case of using the fingerprint sensor 102 with small size as illustrated in FIGS. 4 to 6, registration is performed for each finger 200. As illustrated in FIG. 8, the fingerprint information is registered for each of the case of home position and the case of tilting it up, down, left, and right. In a case where the fingerprint sensor 102 with large size as illustrated in FIG. 10 is used, there is possible to provide a configuration in which a device including the fingerprint sensor 102 is prepared separately from the wearable device and the fingerprint information acquired by the device is transmitted to the wearable device 100 for registration of it. When the fingerprint information for each finger is acquired as described above, the fingerprints 202 of the respective fingers are different, so different processing can be performed depending on the type of the finger 200 detected by the fingerprint sensor 102.

Then, the registration of fingerprint information of each finger allows processing and functions corresponding to each finger to be set. In one example, in the case of entry of text, processing and functions corresponding to the type of finger are set, such as entry of an upper-case full-width digit in a case of authenticating the thumb and entry of a lower-case half-width digit in a case of authenticating the index finger.

Figure 11:
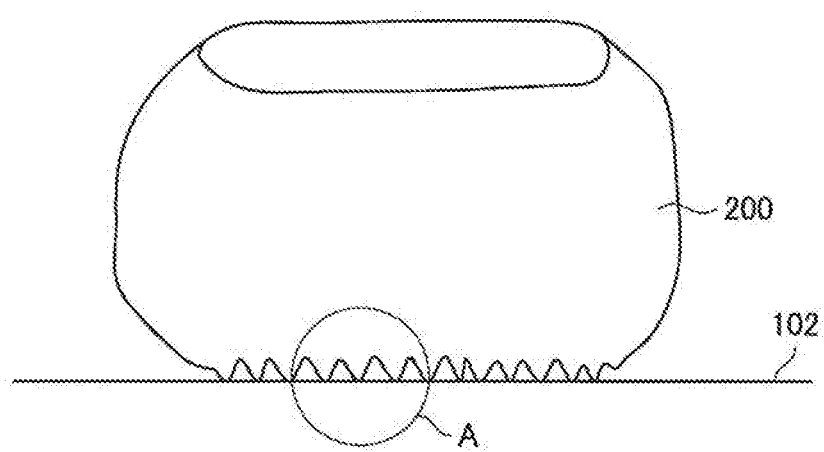
FIG. 11 is an enlarged schematic diagram illustrating a state where a fingerprint of a finger and a surface of a fingerprint information acquisition unit (fingerprint sensor) are in contact with each other.

FIG. 11 is an enlarged schematic diagram illustrating a state in which the finger 200 and the surface (contact surface) of the fingerprint sensor 102 are in contact with each other. In addition, FIGS. 12A and 12B are schematic diagrams illustrating a state in which a region A in FIG. 11 is enlarged, and specifically, FIG. 12A illustrates a case where the pressing force when the finger 200 pushes the fingerprint sensor 102 is relatively small and FIG. 12B illustrates a case where the pressing force is relatively large.

Figure 12A:
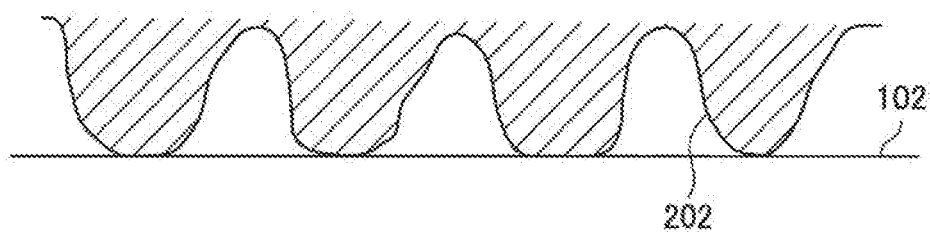
FIG. 12A is a schematic diagram illustrating a state in which a region A in FIG. 11 is enlarged.
Figure 12B:
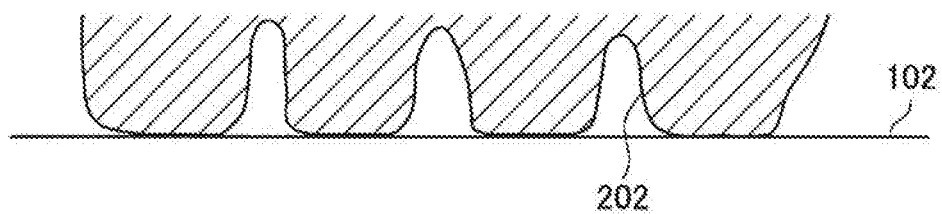
FIG. 12B is a schematic diagram illustrating a state in which a region A in FIG. 11 is enlarged.

As illustrated in FIG. 12A, in the case where the pressing force when the finger 200 pushes the fingerprint sensor 102 is relatively small, the tip of the convex portion of the fingerprint 202 is in contact with the surface of the fingerprint sensor 102. On the other hand, as illustrated in FIG. 12B, in a case where the pressing force when the finger 200 pushes the fingerprint sensor 102 is relatively large, the tip of the convex portion of the fingerprint 202 is in contact with the surface of the fingerprint sensor 102 while being squashed. Thus, it is possible to determine the pressing force of the finger on the basis of the fingerprint information acquired by the fingerprint sensor 102.

Thus, according to the present embodiment, it is possible to perform the specified processing such as activation of the application 124 or movement of the focus, depending on not only the type of finger, the motion of finger, the inclination of finger, and the position of finger, but also the pressing force when the finger pushes the fingerprint sensor 102.

7. Various Processing Based on Fingerprint Determination

As described above, when the type and action of the finger are determined on the basis of the fingerprint information, the processing unit 118 performs various processing in the smartwatch 100 on the basis of the determination. It is applicable to various processing, in addition to the entry of text described above, as the processing based on the fingerprint information. The processing unit 118 performs entry of text, activation of the application 124, and transition (scroll) of the display screen as representative processing. In this event, the processing unit 118 acquires information related to the type of finger, the action of the finger, or the like from the fingerprint determination unit 116, acquires specified processing to be performed depending on the type of finger, the action of the finger, or the like recorded in the registered fingerprint information recording unit 122, and exchanges information with the application 124. This allows the processing such as activation of the application 124, processing relating to entry of text, transition of display screen, or the like to be performed on the basis of the information related to the type of finger, the action of the finger, or the like. Moreover, the processing performed by the processing unit 118 is not limited to these described above, and in one example, is also applicable to the processing as follows.

(1) Switching of functions or applications using operating finger (1-1) Types of text change. In one example, at the time of entry of text, the types of text are changed depending on type of finger, such as upper cases used in case of thumb, lower cases used in case of index finger, numerals used in case of little finger, or the like.

Enter e-mail address, PIN code, or the like to login depending on the type of finger.

(1-2) Scroll unit within screen changes (vertical direction)

Scroll screen switching in case of thumb and scroll normal screen in case of index finger.

(1-3) Display switching unit changes (horizontal direction)

Switch a tab in case of thumb and scroll within screen in case of index finger.

(1-4) Unit of switching content being played back changes

In the case of playing a music piece, switch genres in case of thumb, switch albums in case of index finger, and switch music pieces in case of middle finger.

In the case of programs of radio, TV, or the like, play news in case of thumb, comedy program in case of index finger, and music program in case of middle finger.

(1-5) Functions for content being played back are switched

In the case of playing back music piece, forward previous music piece in case of thumb, play back or pause in case of index finger, and forward next music piece in case of middle finger.

In the case of volume adjustment, turn volume up in case of thumb, set default volume in case of index finger (user setting, etc.), and turn volume down in case of middle finger.

In the case of speech speed adjustment or playback speed adjustment, speed up in case of thumb, speed by default (user setting, etc.) in case of index finger, and speed down in case of middle finger.

(1-6) Operations in device change

Home screen (top screen) in case of thumb, perform operation of "decision" in case of index finger, and perform operation of "return" in case of middle finger.

(1-7) Switch applications to be activated

Activate e-mail in case of thumb, messenger in case of index finger, and social network in case of middle finger.

(2) Activate or switch functions or applications from motion or gestures of operating finger Classify functions such as scrolling in case of thumb, gesture inputting in case of index finger, pointing in case of middle finger, or the like.

(3) Activate or switch functions or applications from order of operating fingers (4) Identify operator of operating finger (personalize) and switch activation or setting values of applications or functions In the case of, for example, a wearable device attached to a body such as clothes, it is also possible to implement a change or the like in the shape of clothing fabric depending on the amount of perspiration and body temperature of the identified individual, which varies depending on the size of clothes of the identified individual.

Personal authentication of shared device

Examples of shared device include family tablets, PCs, computer mice, controllers of game machine, eyeglasses, and the like. In the case of eyeglasses, a fingerprint sensor is provided on a frame or button, and authentication is performed in wearing eyeglasses.

(5) Activate or switch functions or applications depending on short press, long press, or continuous press In the case of playing back content, play or pause with short press, change playback speed with long press, and forward chapter with continuous press.

(6) Activate or switch functions or applications depending on pressing force.

In the case of camera zoom, perform one-step zoom in case of light touch and several-step (continuous) zoom in case of force touch.

In addition, the following processing may be further performed on the basis of the fingerprint information. In a case where the wearable device is a pen type device, a fingerprint sensor is mounted on the pen itself and authentication is performed at the time of holding the pen. In this case, fingerprint authentication may be performed not only for tracing operation but also for flick operation such as flicking.

Further, in a case where a temperature sensor is provided as the other sensor 104, there may be a case where an attempt is made to perform authentication from a finger of a nonhuman finger (artificial object, etc.) by combining fingerprint authentication and the temperature sensor (body temperature measurement) or the like. In this case, no body temperature is measured from the nonhuman finger, so the authentication can be avoided. In addition, in order to exclude nonhuman finger, determination of right hand, determination of left hand, and determination of an operating finger from fingerprints can be made, so GUI may be brought close to the fingers and the operation area may be automatically changed. Furthermore, the coordinate position that is in contact with each operating finger may be corrected, or the correction coefficient of the position that is in contact with each operating finger may be changed. In addition, it is also possible to lock a part of the screen on the screen or perform the fingerprint authentication in touching the screen depending on the authentication result.

Further, age registration may be performed in registering fingerprints so that an age authentication function is provided. In this case, the user operates the touch panel 106 to register user's own age at the time of registration of fingerprints. The registration of age information in association with fingerprint information allows the age information to be obtained from the fingerprint information at the time of fingerprint authentication, and only the website for children is displayed if the user is a child. In addition, if the user is an elderly person, a simple UI with large text display for elderly people is displayed.

Further, in a case where a position sensor (GPS) is provided as the other sensor 104, the degree of security can be changed depending on the situation such as the place and time. In one example, it is assumed that the security is enhanced outside homes or offices but is weakened inside homes or offices. In one example, biometric authentication such as a fingerprint sensor does not necessarily have successful probability of 100%, so authentication is performed in combination with a password. Then, in the authentication by the fingerprint collation unit 114, it is necessary to enter a password outside homes or offices, but the password does not necessarily enter inside homes or offices. In addition, implementation of fingerprint authentication to a VR controller or the like allows who and how it is operated to be recognized, thereby utilizing it for game interaction, individual score, or the like.

Further, in a case where a sensor for detecting the color of a finger is provided as the other sensor, the finger color changes to red with increase in the pressing force by the finger, so it is also possible to obtain the pressing force (finger pressure) by using a change in the finger color and to perform the specified processing determined depending on the pressing force.

According to the present embodiment as described above, the action of the finger is determined on the basis of the fingerprint information, and the specified processing executable by the smartwatch 100 is performed on the basis of the determination result, so it is possible to minimize the operating space. This makes it possible to perform a desired operation depending on the operation even with a compact wearable device.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a fingerprint information acquisition unit configured to acquire fingerprint information;

a determination unit configured to determine an action of a finger on the basis of the fingerprint information; and a processing unit configured to perform specified processing predetermined depending on the action on the basis of the determined action.

(2)

The information processing apparatus according to (1), in which the determination unit determines the action by comparing the fingerprint information with registered fingerprint information registered previously.

(3)

The information processing apparatus according to (1) or (2), in which the determination unit determines an inclination of a finger on the basis of the fingerprint information.

(4)

The information processing apparatus according to (3), in which the determination unit determines the inclination by comparing the fingerprint information with registered fingerprint information registered previously in a state in which the finger is tilted.

(5)

The information processing apparatus according to (1) or (2), in which the fingerprint information acquisition unit acquires the fingerprint information from a fingerprint sensor having a contact surface with which a finger comes into contact, and the determination unit determines motion of a finger along the contact surface on the basis of the fingerprint information.

(6)

The information processing apparatus according to any one of (1) to (5), in which the fingerprint information acquisition unit acquires the fingerprint information from a plurality of fingerprint sensors configured to detect the fingerprint information, and the determination unit determines the action on the basis of the fingerprint information detected from a plurality of the fingerprint sensors.

(7)

The information processing apparatus according to (6), in which the determination unit determines an inclination of a finger by comparing the fingerprint information detected from a plurality of the fingerprint sensors.

(8)

The information processing apparatus according to any one of (1) to (7), including:

an authentication unit configured to authenticate whether or not the fingerprint information matches registered fingerprint information registered previously, in which the determination unit performs the determination in a case where the authentication is successful.

(9)

The information processing apparatus according to (8), in which the authentication unit performs the authentication depending on whether or not an entered password matches a registered password in addition to whether or not the fingerprint information matches the registered fingerprint information.

(10)

The information processing apparatus according to any one of (1) to (9), in which the processing unit performs the specified processing on the basis of information of a type of a finger obtained from the fingerprint information together with the action.

(11)

The information processing apparatus according to any one of (1) to (10), in which the determination unit performs the determination on the basis of the fingerprint information and sensor information obtained from an other sensor other than a fingerprint sensor configured to detect the fingerprint information.

(12)

The information processing apparatus according to (11), in which the other sensor is a position sensor, a temperature sensor, or a finger pressure sensor.

(13)

The information processing apparatus according to any one of (1) to (12), in which the specified processing is processing of activating a specified application predetermined depending on the action.

(14)

The information processing apparatus according to any one of (1) to (12), in which the specified processing is processing related to a text entry function predetermined depending on the action.

(15)

The information processing apparatus according to any one of (1) to (12), in which the specified processing is processing for transition of a display screen predetermined depending on the action.

(16)

The information processing apparatus according to any one of (1) to (15), in which the determination unit determines pressing force of a finger as the action on the basis of the fingerprint information.

(17)

An information processing method including:

acquiring fingerprint information;

determining an action of a finger on the basis of the fingerprint information; and performing specified processing predetermined depending on the action on the basis of the determined action.

(18)

A program causing a computer to function as:

a means configured to acquire fingerprint information;

a means configured to determine an action of a finger on the basis of the fingerprint information; and a means configured to perform specified processing predetermined depending on the action on the basis of the determined action.

REFERENCE SIGNS LIST 100 smartwatch
112 fingerprint information acquisition unit
114 fingerprint collation unit
116 fingerprint determination unit
118 processing unit

The invention claimed is:

1. An information processing apparatus, comprising:
a fingerprint information acquisition unit configured to acquire first fingerprint information;
a determination unit configured to determine an inclination of a finger based on a comparison of the first fingerprint information with second fingerprint information, wherein the second fingerprint information is registered previously in a state in which the finger is tilted; and
a processing unit configured to execute specified processing based on the determined inclination of the finger, wherein
the specified processing is a process of activation of a specified application, and
the specified application is based on the inclination of the finger.

2. The information processing apparatus according to claim 1, wherein
the fingerprint information acquisition unit is further configured to acquire the first fingerprint information from a fingerprint sensor,
the fingerprint sensor has a contact surface with which the finger comes into contact, and
the determination unit is further configured to determine motion of the finger along the contact surface based on the first fingerprint information.

3. The information processing apparatus according to claim 1, wherein
the inclination of the finger corresponds to an action of the finger,
the fingerprint information acquisition unit is further configured to acquire the first fingerprint information from a plurality of fingerprint sensors configured to detect the first fingerprint information, and
the determination unit is further configured to determine the action based on the first fingerprint information detected from the plurality of fingerprint sensors.

4. The information processing apparatus according to claim 3, wherein the determination unit is further configured to determine the inclination of the finger based on comparison of the first fingerprint information detected from the plurality of fingerprint sensors.

5. The information processing apparatus according to claim 1, further comprising an authentication unit configured to authenticate whether the first fingerprint information matches the registered second fingerprint information registered previously,
wherein the determination unit is further configured to perform the determination of the inclination in a case where the authentication is successful.

6. The information processing apparatus according to claim 5, wherein the authentication unit is further configured to perform the authentication based on whether an entered password matches a registered password in addition to the first fingerprint information that matches the registered second fingerprint information.

7. The information processing apparatus according to claim 1, wherein
the determination unit is further configured to obtain information of a type of the finger from the first fingerprint information, and
the processing unit is further configured to perform the specified processing based on the information of the type of the finger obtained from the first fingerprint information.

8. The information processing apparatus according to claim 1, wherein
the inclination of the finger corresponds to an action of the finger,
the determination unit is further configured to perform the determination of the action based on the first fingerprint information and sensor information, and
the sensor information is obtained from a sensor other than a fingerprint sensor configured to detect the first fingerprint information.

9. The information processing apparatus according to claim 8, wherein the sensor is one of a position sensor, a temperature sensor, or a finger pressure sensor.

10. The information processing apparatus according to claim 1, wherein
the inclination of the finger corresponds to an action of the finger,
the specified processing is related to a text entry function, and
the text entry function is based on the action.

11. The information processing apparatus according to claim 1, wherein
the inclination of the finger corresponds to an action of the finger,
the specified processing is for transition of a display screen, and
the transition is based on the action.

12. The information processing apparatus according to claim 1, wherein the determination unit is further configured to determine a pressing force of the finger based on the first fingerprint information.

13. An information processing method, comprising:
in an information processing apparatus:
acquiring first fingerprint information;
determining an inclination of a finger based on a comparison of the first fingerprint information with second fingerprint information, wherein the second fingerprint information is registered previously in a state in which the finger is tilted; and
executing specified processing based on the determined inclination of the finger, wherein
the specified processing is a process of activation of a specified application, and
the specified application is based on the inclination of the finger.

14. A non-transitory computer-readable medium having stored thereon computer-executable instructions which, when executed by a computer, cause the computer to execute operations, the operations comprising:
acquiring first fingerprint information;
determining an inclination of a finger based on a comparison of the first fingerprint information with second fingerprint information, wherein the second fingerprint information is registered previously in a state in which the finger is tilted; and
executing specified processing based on the determined inclination of the finger, wherein
the specified processing is a process of activation of a specified application, and
the specified application is based on the inclination of the finger.

* * * * *